United States Patent
Kawanaka et al.

(10) Patent No.: US 9,800,678 B2
(45) Date of Patent: Oct. 24, 2017

(54) APPARATUS AND METHOD FOR PROCESSING INFORMATION AND PROGRAM FOR THE SAME

(71) Applicant: International Business Machines Corporation, Armonk, NY (US)

(72) Inventors: Risa Kawanaka, Tokyo (JP); Takayuki Osogami, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 14/554,181

(22) Filed: Nov. 26, 2014

(65) Prior Publication Data

US 2015/0149553 A1 May 28, 2015

(30) Foreign Application Priority Data

Nov. 28, 2013 (JP) .................................. 2013-246493

(51) Int. Cl.
*G06F 15/16* (2006.01)
*H04L 29/08* (2006.01)
*H04L 12/58* (2006.01)

(52) U.S. Cl.
CPC .............. *H04L 67/22* (2013.01); *H04L 51/32* (2013.01); *H04L 67/306* (2013.01)

(58) Field of Classification Search
USPC ......................................................... 709/204
See application file for complete search history.

(56) References Cited

FOREIGN PATENT DOCUMENTS

| | | | | |
|---|---|---|---|---|
| JP | 2004070696 A | * | 3/2004 | |
| JP | 2004154248 A | * | 6/2004 | |
| JP | 2011198170 A | * | 10/2011 | |
| JP | 2012033089 A | * | 2/2012 | |
| JP | WO 2012081080 A1 | * | 6/2012 | ............ G06F 11/324 |
| JP | 2012141720 A | | 7/2012 | |
| JP | 2013122630 A | | 6/2013 | |
| WO | 2012081080 A1 | | 6/2012 | |

OTHER PUBLICATIONS

Notification of Reasons for Refusal, Japan Application No. 2013-246493, Apr. 20, 2016, 4 pgs.

(Continued)

*Primary Examiner* — Hee Soo Kim
(74) *Attorney, Agent, or Firm* — Jared L. Montanaro

(57) ABSTRACT

In a first aspect of the present invention, provided are an information processing apparatus including a behavior-history acquisition unit configured to acquire behavior histories of first users identified by first-user identification information, a transmission-history acquisition unit configured to acquire information transmission histories of second users identified by second-user identification information, and a determination unit configured to determine identity between the first users and the second users on the basis of behavior details included in the behavior histories and transmission details included in the transmission histories; a method for processing information with the information processing apparatus; and a program using the information processing apparatus.

12 Claims, 6 Drawing Sheets

(56) References Cited

OTHER PUBLICATIONS

Written Argument, Japan Application No. 2013-246493, translated Nov. 29, 2016, 10 pgs.
Decision to Grant a Patent, Japan Application No. 2013-246493, Aug. 16, 2016, 6 pgs.
Kawanaka et al., "Apparatus and Method for Processing Information and Program for the Same," U.S. Appl. No. 15/366,282, filed Dec. 1, 2016.
List of IBM Patents or Patent Applications Treated as Related, Nov. 29, 2016, 2 pgs.
Japanese Patent Application No. 2013-246493, filed Nov. 28, 2013.
Partial translation of Japanese Office Action dated Apr. 26, 2016 from Japanese Patent Application No. 2013-246493.

\* cited by examiner

FIG. 3
EXAMPLE OF TRANSMISSION HISTORY
SNS POSTING HISTORY
I RECEIVED CD FROM ON-LINE SHOP ABC.
yamadataro - 10/11/20xx, 12:11
ABC SEEMS TO OFFER FREE DELIVERY.
Nagainu - 10/12/20xx, 10:34
HI ABC, PLEASE SEND CD OF XXX BAND QUICKLY.
yumix1977 - 10/12/20xx, 20:05
I HEARD THAT SPECIAL PRIVILEGE CALENDAR IS GREAT.
yukoTokyO - 10/13/20xx, 01:51
I'VE GOT LONG-CHERISHED LIMITED-EDITION DISC.
ichiroT - 10/13/20xx, 09:45
⋮

FIG. 4

EXAMPLE OF BEHAVIOR HISTORY

PURCHASE HISTORY IN EC SITE

ID: TARO YAMADA    ITEM: BOOK AAA    ADDRESS: AA PREFECTURE AA
PURCHASE DATE: 10/11/20XX    DELIVERY DATE: 10/12/20XX

ID: YUMI YAMAGUCHI    ITEM: CD XXX    ADDRESS: CC PREFECTURE CC
PURCHASE DATE: 10/12/20XX    DELIVERY DATE: 10/14/20XX

ID: ICHIRO WATANABE    ITEM: CD YYY    ADDRESS: CC PREFECTURE BB
PURCHASE DATE: 10/12/20XX    DELIVERY DATE: 10/15/20XX

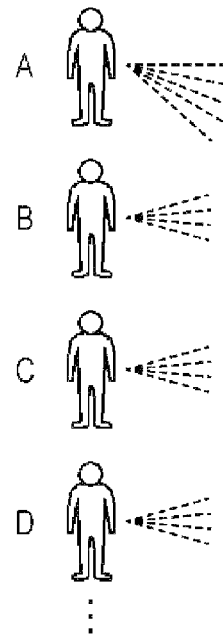
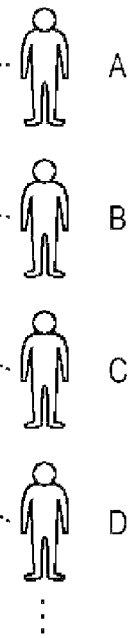

FIRST USER / SECOND USER

DEGREE OF SIMILARITY AA
DEGREE OF SIMILARITY AB
DEGREE OF SIMILARITY AC
DEGREE OF SIMILARITY AD

APPARATUS AND METHOD FOR PROCESSING INFORMATION AND PROGRAM FOR THE SAME

CROSS-REFERENCE TO RELATED APPLICATION

This application claims the benefit of priority under 35 U.S.C. §119 from Application No. 2013-246493, filed on Nov. 28, 2013 in Japan.

BACKGROUND

The present invention relates to an apparatus and a method for processing information and a program for the same.

A method for identifying users in a plurality of social network services (SNSs) is known in the related art (for example, Patent Literature 1).

CITATION LIST

[Patent Literature 1] Japanese Unexamined Patent Application Publication No. 2013-122630

SUMMARY

However, there is no known method for specifying identity between users by associating transmission histories of users in SNSs or the like with actual behaviors of users, such as product purchase.

In a first aspect of the present invention, provided are an information processing apparatus including a behavior-history acquisition unit configured to acquire behavior histories of first users identified by first-user identification information, a transmission-history acquisition unit configured to acquire information transmission histories of second users identified by second-user identification information, and a determination unit configured to determine identity between the first users and the second users on the basis of behavior details included in the behavior histories and transmission details included in the transmission histories; a method for processing information with the information processing apparatus; and a program using the information processing apparatus.

Note that the outline of the present invention described above include not all necessary features of the present invention and that a sub-combination of these features can also be the present invention.

BRIEF DESCRIPTION OF THE DRAWINGS

FIG. 3 is a diagram illustrating an example of a transmission history of the embodiment.

FIG. 4 is a diagram illustrating an example of a behavior history of this embodiment.

FIG. 5 is a diagram illustrating examples of the degree of similarity that a degree-of-similarity calculation section 114 calculates in this embodiment.

DETAILED DESCRIPTION

Although the present invention will be described hereinbelow based on embodiments, it is to be understood that the embodiments do not limit the scope of claims of the present invention. Not all combinations of features described in the embodiments are absolutely necessary for the solutions of the present invention.

Figure 1:
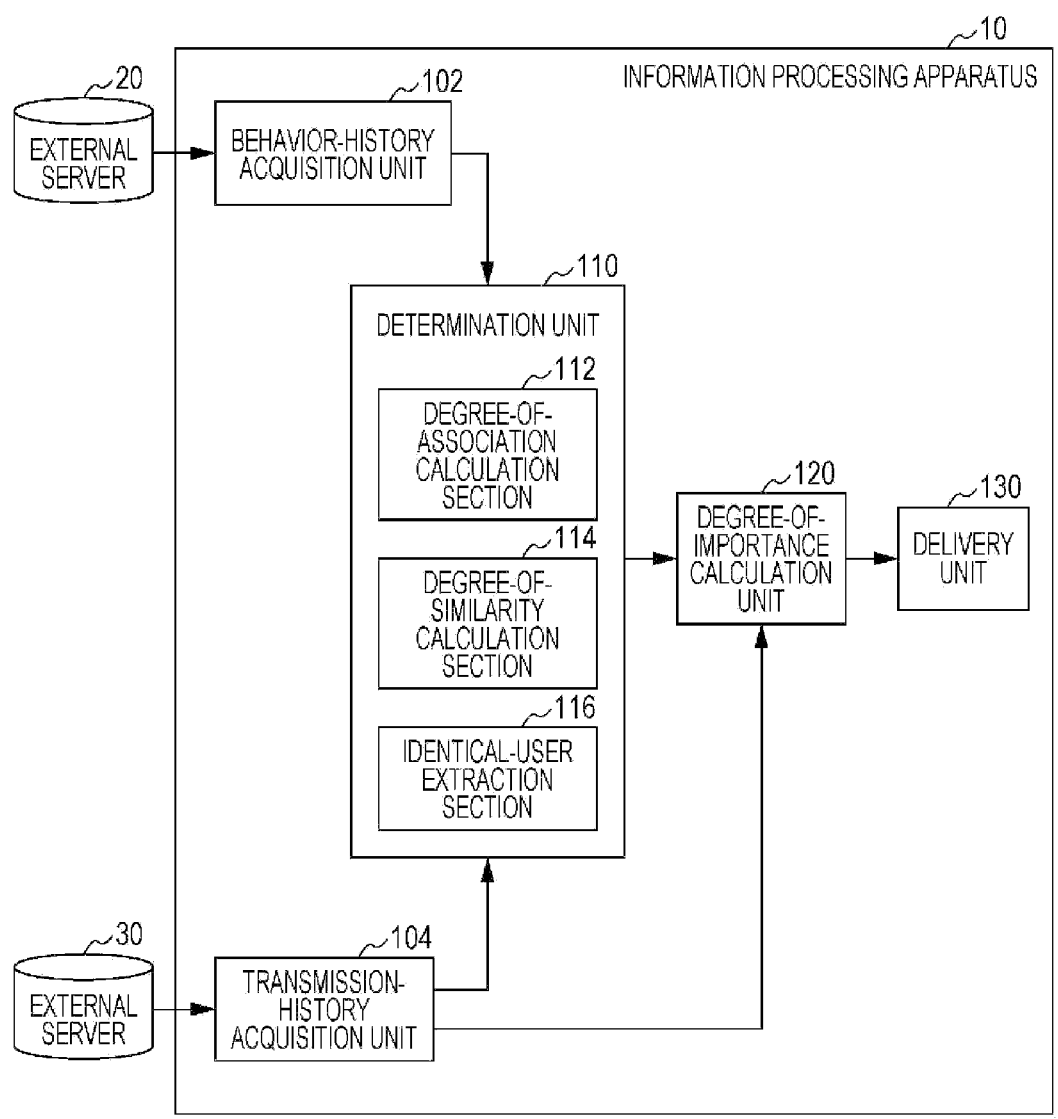
FIG. 1 is a diagram illustrating the configuration of an information processing apparatus 10 of an embodiment.

FIG. 1 illustrates the configuration of an information processing apparatus 10 of an embodiment. The information processing apparatus 10 acquires a behavior history, such as a product purchase history, from an external server 20 and acquires an SNS posting transmission history from an external server 30. Here, the service of the external server 20 and the service of the external server 30 may be separately provided. Therefore, one and the same person registers the service of the external server 20 and the service of the external server 30 separately and is provided with separate log-in IDs or the like.

The information processing apparatus 10 detects whether the IDs of such separately registered services are of one and the same person. The information processing apparatus 10 includes a behavior-history acquisition unit 102, a transmission-history acquisition unit 104, a determination unit 110, a degree-of-importance calculation unit 120, and a delivery unit 130.

The behavior-history acquisition unit 102 acquires behavior histories of first users identified by first-user identification information. For example, the behavior-history acquisition unit 102 acquires behavior histories, such as product purchase histories, for a plurality of first users identified by the first-user identification information, such as log-in IDs in an on-line shopping service or the like, that the external server 20 provides, from the external server 20. The behavior-history acquisition unit 102 provides the acquired behavior histories to the determination unit 110.

The transmission-history acquisition unit 104 acquires information transmission histories of second users identified by second-user identification information. For example, the transmission-history acquisition unit 104 acquires message transmission histories of a plurality of second users identified by second-user identification information, such as log-in IDs in SNS services provided by the external server 30, from the external server 30. The transmission-history acquisition unit 104 provides the acquired transmission histories to the determination unit 110.

The determination unit 110 determines the identity between the first users and the second users on the basis of behavior details included in the behavior histories and transmission details included in the transmission histories. For example, the determination unit 110 calculates the degrees of association of combinations of a behavior history of each first user and a transmission history of each second user also on the basis of behavior details included in the behavior histories and behavior timing and transmission details included in the transmission histories and transmission timing and determines the identity between the first users and the second users on the basis of the plurality of degrees of association of the plurality of combinations. The determination unit 110 includes a degree-of-association calculation section 112, a degree-of-similarity calculation section 114, and an identical-user extraction section 116.

The degree-of-association calculation section 112 calculates the degree of association for each of combinations of a behavior history of each first user and a transmission history of each second user. Furthermore, the degree-of-association calculation section 112 may calculate a difference indicating the degree of difference between each first user and each second user for each of combinations of a behavior history of each first user and a transmission history of each second user. The degree-of-association calculation section 112 provides the calculated degrees of association and the degrees of difference to the degree-of-similarity calculation section 114.

The degree-of-similarity calculation section 114 calculates the degree of similarity for each of combinations of a first user and a second user on the basis of the plurality of degrees of association and so on. The degree-of-similarity calculation section 114 provides the calculated degrees of similarity to the identical-user extraction section 116.

The identical-user extraction section 116 extracts combinations of a first user and a second user whose similarity is a predetermined threshold or greater from among the combinations of a first user and a second user. The identical-user extraction section 116 provides the extracted combinations of each first user and each second user to the degree-of-importance calculation unit 120.

The degree-of-importance calculation unit 120 calculates the degree of importance of a user specified from a first user and a second user corresponding to a combination of the first user and the second user on the basis of the degree of similarity between the first user and the second user and the degree of influence of transmission of information from the second user included in the combination. For example, the degree-of-importance calculation unit 120 highly estimates the degree of importance of a user specified from a combination of a first user and a second user whose degree of similarity and degree of influence of transmission are high. The degree-of-importance calculation unit 120 provides the calculated degrees of importance of the user to the delivery unit 130.

The delivery unit 130 delivers information to users whose degree of importance satisfies a predetermined condition. For example, the delivery unit 130 may deliver direct mail related to a product or the like to first users whose degree of importance is a threshold value or greater.

In this way, the information processing apparatus 10 can extract a combination of a first user and a second user who may be an identical user by associating the first users included in behavior histories and the second users included in transmission histories using their behavior details and transmission details. Furthermore, the information processing apparatus 10 can effectively transmit information to first users who may have a high degree of influence.

Figure 2:
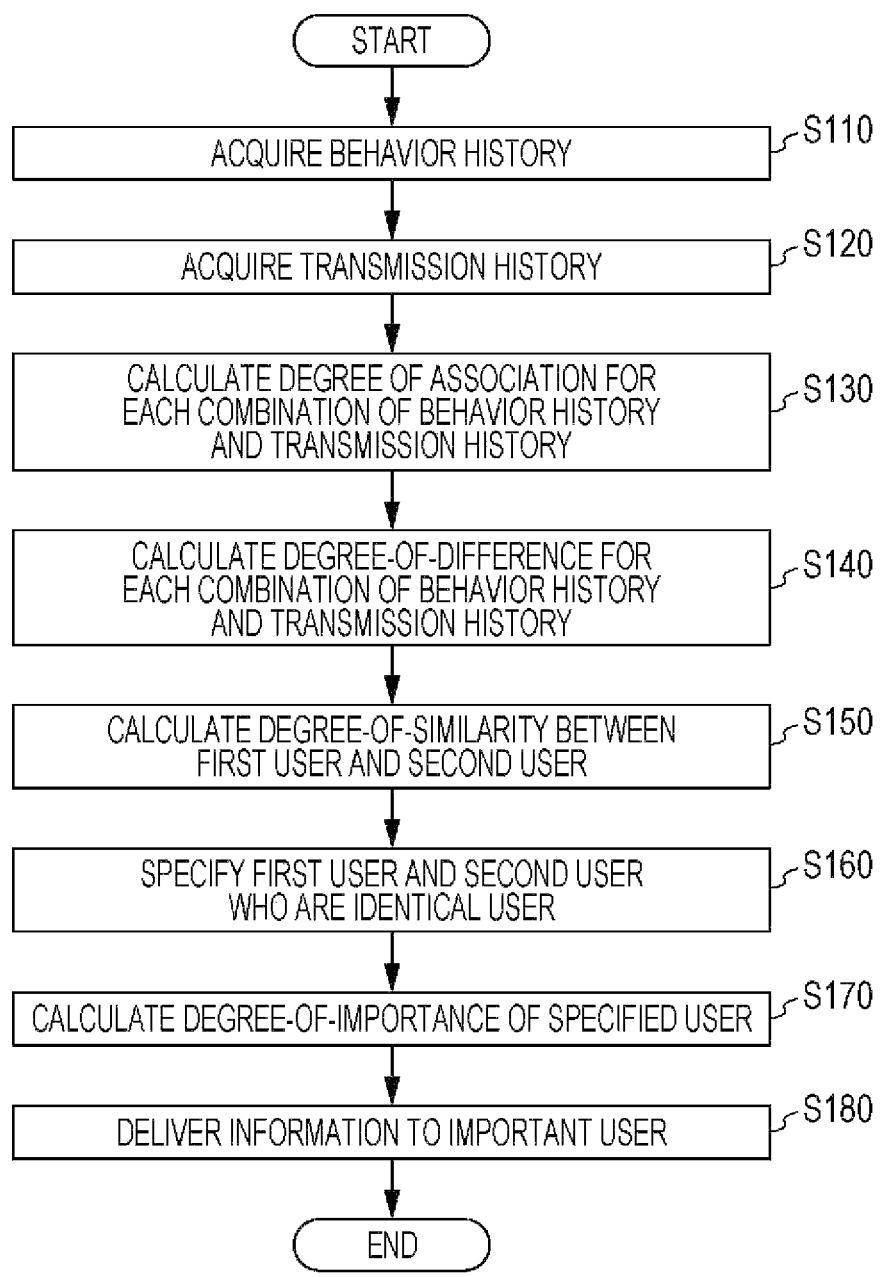
FIG. 2 is a flowchart for the process of the information processing apparatus 10 of the embodiment.

FIG. 2 is a flowchart for the process of the information processing apparatus 10 of this embodiment. The information processing apparatus 10 executes a method for processing information according to this embodiment by performing the process from S110 to S180.

First, in S110, the behavior-history acquisition unit 102 acquires behavior histories of first users identified by the first-user identification information from the external server 20. For example, the behavior-history acquisition unit 102 may acquire product or service purchase histories as the behavior histories of the first users via the Internet. In an example, the behavior-history acquisition unit 102 may acquire, for a plurality of first users, a set of first identification information, such as a user ID, and a product purchase history including a purchased-product name, a purchased-product price, a purchased-product category, a purchased-product destination address, and purchase date and time. The behavior-history acquisition unit 102 may acquire behavior histories from a plurality of external servers 20 for a plurality of same/different services.

Furthermore, the behavior-history acquisition unit 102 may acquire first profile information on first users from an electronic commerce (EC) site or the like. For example, the behavior-history acquisition unit 102 may acquire, as the first profile information, user profiles each including the first identification information, name, mail address, address, and/or taste, and the like of a first user. The behavior-history acquisition unit 102 provides the acquired behavior histories and so on to the determination unit 110.

Next, in S120, the transmission-history acquisition unit 104 acquires information transmission histories of second users identified by second-user identification information from the external server 30. For example, the transmission-history acquisition unit 104 may acquire posting histories of the second users, which are histories of posting of information to a Website that receives the posting using the second-user identification information. The transmission-history acquisition unit 104 may acquire transmission histories from a plurality of external servers 30 for a plurality of same/different services.

In an example, the transmission-history acquisition unit 104 may acquire, as transmission histories of a plurality of second users, the second-user identification information, such as user IDs, text transmitted on the Internet, text, sound, images, and/or moving images posted to a Website. Here, the transmission-history acquisition unit 104 may acquire the posted text, text extracted from the posted sound, and/or text analyzed from the posted images or moving images as information transmission histories of the second users.

Here, the transmission-history acquisition unit 104 may acquire transmission histories obtained by searching for original transmission histories with another external server. For example, the transmission-history acquisition unit 104 may acquire transmission histories extracted by searching for transmission histories, which are opened on the Internet by the external server 30, with a search server of a Web search engine.

In an example, the transmission-history acquisition unit 104 may extract, from a plurality of transmission histories, a transmission history including information related to a behavior detail or information on a product or service related to the behavior history, for example, a history including a keyword indicating that a product or service related to the behavior history was purchased.

Specifically, in the case where the behavior-history acquisition unit 102 acquires product purchase histories on the Internet, the transmission-history acquisition unit 104 may searches for transmission histories using keywords related to product purchase on the Internet, such as "buy", "purchase", "sale", "reserve", "distribute", "deliver", and/or "the name of a service that the external server 20 provides (for example, the name of a service that an EC site provides)" to search for transmission histories including the keywords.

Furthermore, the transmission-history acquisition unit 104 may acquire second profile information on second users from a Website serving as a posting destination. For example, the transmission-history acquisition unit 104 may acquire, as second profile information, user profiles each including the second identification information, mail address, name, address, community to which the second user belongs, and/or taste of the second user.

Furthermore, the transmission-history acquisition unit 104 may acquire information on the degrees of influence of second users from a Website (for example, the numbers of followers and/or friends of the second users in the Website from the Website). The transmission-history acquisition unit 104 may provide the transmission histories and profile information of a plurality of second users to the determination unit 110 and may provide information on the degrees of influence of the plurality of second users to the degree-of-importance calculation unit 120.

Next, in S130, the degree-of-association calculation section 112 calculates the degree of association for each of combinations of a behavior history of a first user and a transmission history of a second user. For example, first, the degree-of-association calculation section 112 calculates the degree of agreement q(x(id,n),y(ID,N)) so that the degree becomes higher as the degree of agreement between a behavior detail x(id,n) in the behavior history of a first user id having first identification information id and a transmission detail in the transmission history of a second user ID having the extracted second identification information ID increases.

In an example, if a behavior detail in a behavior history is that "a first user bought a specific product (for example, a product XXX) in a specific EC site (for example, an on-line ship ABC)", and if a transmission detail in a transmission history is "text posted by a second user by clicking a posting button (for example, a tweet button or a like button) in an SNS and by posting a comment that the second user bought the specific product (for example, the product XXX) in the specific EC site (for example, the on-line ship ABC), the degree-of-association calculation section 112 may estimate the degree of agreement to be 1.

In another example, if a behavior detail in the behavior history is that "a first user bought a specific product (for example, a product XXX) in a specific EC site (for example, an on-line shop ABC)", and if a transmission detail in the transmission history is "text including the URL of the specific product (for example, the product XXX) in the specific EC site (for example, the on-line shop ABC) and a word closely related to purchase, such as "purchase", "buy", "bought", "distribution" or "deliver", the degree-of-association calculation section 112 may estimate the degree of agreement to be 0.8.

In another example, if a behavior detail in the behavior history is that "a first user bought a specific product (for example, a product XXX) in a specific EC site (for example, an on-line shop ABC), and if a transmission detail in the transmission history is "text including a partial character string of the name of the specific product (for example, the product XXX) and a word related to purchase, such as "purchase", "buy", "bought", "received", "distribution" or "deliver", the degree-of-association calculation section 112 may estimate the degree of agreement to be 0.6.

In another example, if a behavior detail in the behavior history is that "a first user bought a specific product (for example, a product XXX) in a specific EC site (for example, an on-line shop ABC), and if a transmission detail in the transmission history is "text including a partial character string of the name of the specific product (for example, the product XXX), the degree-of-association calculation section 112 may estimate the degree of agreement to be 0.5.

In another example, if a behavior detail in the behavior history is that "a first user bought a specific product (for example, a product XXX) in a specific EC site (for example, an on-line shop ABC), and if a transmission detail in the transmission history is "text including the category name (for example, "book", "music", and/or "daily product") of the specific product (for example, the product XXX) in the specific EC site (for example, the on-line shop ABC), the degree-of-association calculation section 112 may estimate the degree of agreement to be 0.2.

The degree-of-association calculation section 112 may assign the degree of agreement in consideration of the time and difference between the date and time of a behavior in a behavior history and the date and time of transmission in a transmission history. For example, if the transmission date and time is after the behavior date and time, the degree-of-association calculation section 112 may assign a higher degree of agreement than that when transmission date and time is before the behavior date and time. For example, if the difference between the transmission date and time and the behavior date and time is within one day, the degree-of-association calculation section 112 may multiply the degree of agreement by 1; if the difference is within two days, may multiply the degree of agreement by 0.8; if the degree is within three days, may multiply the degree of agreement by 0.5; if the difference is within one week, may multiply the degree of agreement by 0.2; and if the difference is one week or more, may multiply the degree of agreement by 0. Here, in the case where the price of a purchased product in the behavior history is high, the degree-of-association calculation section 112 may set the reference difference between the transmission date and time and the behavior date and time longer than that when the product price is low.

Alternatively, the degree-of-association calculation section 112 may calculate the degree of agreement of each of combinations of a behavior detail in the behavior history and a transmission detail in a transmission history using logistic regression. For example, the degree-of-association calculation section 112 may assign the degree of agreement in consideration of (i) whether the transmission detail in the transmission history includes a partial character string of the name of the shop, (ii) whether the transmission detail in the transmission history includes the URL of a bought product, (iii) whether the transmission detail in the transmission history includes a partial character string of the name of the bought product, (iv) whether the transmission detail in the transmission history includes a word related to purchase, such as "purchase" and "received, and (v) the time difference between the behavior date and time and the transmission date and time. In an example, the degree-of-association calculation section 112 may calculate the degree of agreement using the conditions (i) to (v) as features so that the degree of agreement increases to the range of 0 to 1 as the behavior detail and the behavior detail agree increasingly.

Next, in S120, the degree-of-association calculation section 112 calculates the degree of association λ(x(id,n),y(ID,N)) between the behavior detail x(id,n) in the behavior history and the transmission detail y(ID,N) in the transmission history on the basis of the calculated degree of agreement q(x(id,n),y(ID,N)).

The degree-of-association calculation section 112 may calculate the degree of association λ(x,y) using Eq. 1.

$$\lambda(x,y)=1+(r-1)q(x,y) \qquad \text{Eq. 1}$$

where r is a coefficient exceeding 1, which is given to the whole of the behavior history and the transmission history and is a weight that the degree of agreement q gives to the degree of association λ. For example, the degree-of-association calculation section 112 may use a predetermined real number r or a real number r determined by cross-validation using part of the behavior history and the transmission history or test data.

Next, in S140, the degree-of-association calculation section 112 calculates the degree of difference κ(x(id,n),y(ID,N)) indicating the degree of difference between a first user id and a second user ID for each of combinations of the behavior history n of each first user id and the transmission history N of each second user ID.

For example, first, the degree-of-association calculation section 112 calculates the degree of disagreement q'(x(id,n),y(ID,N)) indicating the degree of disagreement between the behavior detail x(id,n) in the behavior history of a first user and the transmission detail y(ID,N) in the transmission history of a second user for each of combinations of a behavior detail in the behavior history and a transmission detail in the transmission history.

In an example, if a transmission detail in a transmission history includes a description on a place name and the difference between the transmission date and time in the transmission history and the behavior date and time in the behavior history is within a predetermined difference, the degree-of-association calculation section 112 may calculate a degree of disagreement ranging from 0 to 1 so that the value increases as the distance between a product destination address included in the behavior history and the place name included in the transmission detail increases.

In another example, if the transmission detail in the transmission history includes at least part of the product name and at least part of a comment contradicting purchase, such as "want" or "jealous", the degree-of-association calculation section 112 may calculate a degree of disagreement ranging from 0 to 1 so that the value increases as the proportion of agreement between the transmission detail and the product name and the proportion of agreement between the transmission detail and the comment contradicting the purchase increase.

Next, the degree-of-association calculation section 112 calculates the degree of difference κ(x(id,n),y(ID,N)) between the behavior history n and the transmission history N on the basis of the calculated degree of disagreement q'(x(id,n),y(ID,N)).

The degree-of-association calculation section 112 may calculate the degree of difference κ(x,y) using Eq. 2.

$$\kappa(x,y)=1+(r'-1)q'(x,y) \quad \text{Eq. 2}$$

where r' is a coefficient less than 1, which is given to the whole of behavior history and the transmission history and is a weight that the degree of disagreement q' gives to the degree of difference κ. For example, the degree-of-association calculation section 112 may use a predetermined real number r' or a real number r' determined by cross-validation using part of the behavior history and the transmission history or test data.

Next, in S150, the degree-of-similarity calculation section 114 calculates the degree of similarity for each of combinations of each first user id and each second user ID on the basis of the result of accumulation of the degrees of association λ calculated in S130 and the degrees of difference κ calculated in S140. The degree-of-similarity calculation section 114 may further calculate the degree of similarity on the basis of the profile information on the first users and the profile information on the second users. For example, the degree-of-similarity calculation section 114 may calculate the degree of similarity S(id,ID) between the first user id and the second user ID using Eq. 3.

$$S(id, ID) = \left(\prod_n \prod_N \lambda(x(id, n), y(ID, N))\right) \quad \text{Eq. 3}$$

-continued $$\left(\prod_n \prod_N k(x(id, n), y(ID, N))\right) p(id, ID)$$

where p(id,ID) is a profile similarity indicating the degree of similarity between the first profile information on the first user id and the second profile information on the second user ID.

For example, the degree-of-similarity calculation section 114 may set the profile similarity p(id,ID) high when the prefecture of an address in the first profile information on the first user id and the prefecture of an address included in the second profile information on the second user ID agree. Alternatively, the degree-of-similarity calculation section 114 may set the profile similarity p(id,ID) high when a character string included both in a mail address in the first profile information and in an account character string of the second user ID is present.

Alternatively, for example, the degree-of-similarity calculation section 114 may set the profile similarity p(id,ID) using logistic regression on the basis of whether the profile information on the first user id and the profile information on the second user ID include (i) the same prefecture, (ii) a common character string between the first identification information or the mail address of the first user id and the second identification information or the mail address of the second user ID, and/or (iii) a common character string.

The degree-of-similarity calculation section 114 may calculate the profile similarity p(id,ID) also on the basis of the degree of similarly between information on the first user id (for example, the log-in state and/or log-in frequency of the first user) other than the first profile information and information on the second user ID (for example, the log-in state and/or log-in frequency of the second user) other than the second profile information. The degree-of-similarity calculation section 114 may set the profile similarity p(id,ID)=1 in the case where sufficient information cannot be obtained from the profile information, such as when information more than a predetermined amount cannot be obtained from at least one of the first profile and the second profile.

Next, in S160, the identical-user extraction section 116 specifies a combination of a first user id and a second user ID who may be an identical user at high possibility. For example, the identical-user extraction section 116 extracts a combination of a first user id and a second user ID whose degree of similarity is a predetermined threshold value or greater from combinations of a first user id and a second user ID. The identical-user extraction section 116 provides the extracted combination of a first user id and a second user ID to the degree-of-importance calculation unit 120.

Next, in S170, the degree-of-importance calculation unit 120 calculates the degree of importance of the user of the combination specified as an identical user. For example, the degree-of-importance calculation unit 120 calculates the degree of influence E of the second user ID according to information on the degree of influence of the second user ID (for example, the number of followers and/or friends of the second user ID).

In an example, the degree-of-importance calculation unit 120 may set the degree of influence E to 1 (follower: 1,000 or more), 0.8 (follower: 100 to less than 1,000), 0.5 (follower: 20 or more to less than 100), 0.2 (follower: 10 or more to less than 20), or 0 (follower: less than 10) depending on the number of followers of the second user ID.

Next, the degree-of-importance calculation unit 120 calculates the degree of importance I(id,ID) of the first user id and the second user ID by multiplying the degree of similarity S(id,ID) of the combination of the first user id and the second user ID by the degree of influence E(ID) of the second user ID. The degree-of-importance calculation unit 120 provides the calculated degree of importance I(id,ID) to the delivery unit 130.

Next, in S180, the delivery unit 130 delivers information to a first user id who is determined to be important. For example, the delivery unit 130 may transmit, to a first user id whose degree of importance I(id,ID) is a predetermined threshold value or greater, direct mail, advertisement, and/or samples of products related to a product that a second user ID corresponding to the first user id bought.

In this way, the information processing apparatus 10 calculates the degree of association q and the degree of difference q' for each of combinations of a behavior history and a transmission history, calculates the degree of similarity S(id,ID) of the first and second users id and ID on the basis of the accumulated degrees of association and degrees of difference of combinations of a first user id and a second user ID, and specifies a combination of a first user id and a second user ID having a high degree of similarity S(id, ID) as a combination who may be an identical user at high possibility. In this way, the information processing apparatus 10 can achieve name identification of a user in a behavior history and a user in a transmission history.

Furthermore, the information processing apparatus 10 determines that a first user id having a high degree of influence among users specified to be identical is a user having a high degree of importance and selectively transmits information to the user having the high degree of importance, and thus can advertise products and so on to the user.

In a first modification of this embodiment, the degree-of-association calculation section 112 may omit the process in S140. In this case, in S150, the degree-of-similarity calculation section 114 may calculate the degree of similarity S(id,ID) using Eq. 3 in which ΠΠκ(x,y) is removed from the right side thereof.

In a second modification of this embodiment, in S140, the degree-of-association calculation section 112 may calculate the degree of disagreement q"(X(id,n),y(ID,N)) for each of combinations of a first user id and a transmission detail y(ID,N) in the transmission history instead of calculating the degree of disagreement q'(x(id,n),y(ID, N)) for each of combinations of the behavior detail x(id,n) of the first user id and the transmission details y(ID,N) of the second user ID.

For example, the transmission detail of the second user ID refers to a purchased product or the like; however, if there is no product or the like corresponding to the purchase history of the first user id, the degree-of-association calculation section 112 may assign a high degree of disagreement q"(X(id,n),y(ID,N)) to a combination of a first user id and a comment N of the second user ID.

In a third modification of this embodiment, the information processing apparatus 10 may use a transportation use history as a behavior history instead of the purchase history of a product or the like. For example, in S110, the behavior-history acquisition unit 102 acquires a transportation use history as a behavior history. In an example, the behavior-history acquisition unit 102 may acquire use histories, including get-on and get-off stations, of a plurality of users from a use-history database server of an external transportation.

In S130, the degree-of-association calculation section 112 may assign the degree of agreement q(x(id,n),y(ID,N)) to each of combinations of the transportation use detail x(id,n) of the first user id and the transmission detail y(N, ID) of the second user ID. For example, if a transportation use history includes a word of a get-on or get-off station or part thereof, the word of the place name of a get-on or get-off station or part thereof, or the word of a line name supposed to be used or part thereof, the degree-of-association calculation section 112 may set the degree of agreement so as to increase in this order.

In a fourth modification of this embodiment, the information processing apparatus 10 may calculate the degrees of association between behavior histories and transmission histories in advance on the basis of the acquired behavior histories and transmission histories to specify a combination of a first user and a second user.

The information processing apparatus 10 of this modification may acquire a new behavior history and transmission history in addition to the acquired behavior histories and transmission histories as the need arises and may calculate the degree of association (and the degree of difference) between the new behavior history and transmission history and the acquired behavior histories and transmission histories, thereby updating the degree of similarity between the first users and the second users to thereby update the combinations of the first user and the second user.

In this case, in S130, the degree-of-association calculation section 112 may calculate the coefficient r in Eq. 1 on the basis of Eq. 4.

$$r = \frac{\frac{\sum_{id} m(id)}{\sum_{id} M(id)}}{\frac{\sum_{id} n(id)N(id)}{\left(\sum_{id} n(id)\right)\left(\sum_{id} N(id)\right)}} \qquad \text{Eq. 4}$$

where id in Eq. 4 may be identification information provided to a combination of a first user and a second user determined to be an identical user from the acquired behavior histories and transmission histories; for example, the id of an identical user 1 is given to a first combination of a first user id and a second user ID, and the id of an identical user 2 is given to a second combination of a first user id and a second user ID.

Here, n(id) is the number of behavior histories related to the identical user id (for example, the number of purchases), and Σn(id) is the sum of the number of behavior histories of all the identical users. N(id) is the number of transmission histories related to the identical user id (for example, the number of comments posted on an SNS), and ΣN(id) is the sum of the number of transmission histories of all the identical users.

Here, m(id) is the number of transmission details related to any of the behavior details in the behavior history of an identical user among the transmission details in transmission histories related to the identical users id (for example, transmission details whose calculated degrees of association are a predetermined threshold value or greater, and Σm(id) is the sum of the numbers m(id) of all the identical users.

M(id) is the number of transmission details related to any of the behavior histories of all the identical users among the transmission details in the transmission histories of the identical users id (for example, transmission details whose calculated degrees of association are a predetermined threshold value or greater), and ΣM(id) is the sum of the numbers M(id) of all the identical users. Σn(id)N(id) is the sum of the numbers n(id)×N(id) of all the identical users id.

In S140, the degree-of-association calculation section 112 of this modification may calculate r' on the basis of Eq. 5.

$$r' = \frac{\dfrac{\sum_{id} m'^{(id)}}{\sum_{id} M'^{(id)}}}{\dfrac{\sum_{id} n'^{(id)} N'^{(id)}}{\sqrt{\left(\sum_{id} n'(id)\right)\left(\sum_{id} N'(id)\right)}}} \quad \text{Eq. 5}$$

where id, n'(id), and N'(id) in Eq. 5 may be the same as id, n(id), and N(id) in Eq. 4.

Where, m'(id) is the number of transmission details determined to be contradictory to any of the behavior details in the behavior history of an identical user among the transmission details in transmission histories related to the identical user id (for example, transmission details whose calculated degrees of difference are a predetermined threshold value or greater), and Σm'(id) is the sum of the numbers m'(id) of all the identical users. M'(id) is the number of transmission details determined to be contradictory to any of the behavior details of an identical user among the transmission details related to the identical user id (for example, transmission details whose calculated degrees of difference are a predetermined threshold value or greater), and ΣM'(id) is the sum of numbers M'(id) of all the identical users.

FIG. 3 illustrates an example of a transmission history according to this embodiment. The transmission-history acquisition unit 104 may acquire a history of posting to SNS, such as a microblogging site. For example, as shown in FIG. 3, the transmission history that the transmission-history acquisition unit 104 acquires includes the second identification information (for example, "yamadataro"), posted comments, posting dates and times of the second users. The posted comments include information, such as shops at which the second users bought products ("on-line shop ABC" and "ABC"), and purchased product information ("CD", "a band XXX", and "a XXX limited disc").

FIG. 4 illustrates an example of the behavior history of this embodiment. The behavior-history acquisition unit 102 may acquire a purchase history in an EC site. For example, as shown in FIG. 4, the behavior-history acquisition unit 102 acquires the first identification information on the first users (for example, "Taro Yamada"), products that the first users bought ("a book AAA" etc.), addresses ("AA prefecture AA" etc.), purchase dates, and delivery dates.

FIG. 5 illustrates examples of the degree of similarity that the degree-of-similarity calculation section 114 calculates in this embodiment. As shown in FIG. 5, the degree-of-similarity calculation section 114 calculates the degrees of similarity of combinations of a plurality of first users A to D and a plurality of second users A to D. For example, the degree-of-similarity calculation section 114 calculates the degree of similarity AA for a combination of the first user A and the second user A, the degree of similarity AB for a combination of the first user A and the second user B, the degree of similarity AC for a combination of the first user A and the third user C, and the degree of similarity AD for a combination of the first user A and the second user D. In this way, the degree-of-similarity calculation section 114 calculates the degree of similarity for all combinations of all first users and all second users.

Figure 6:
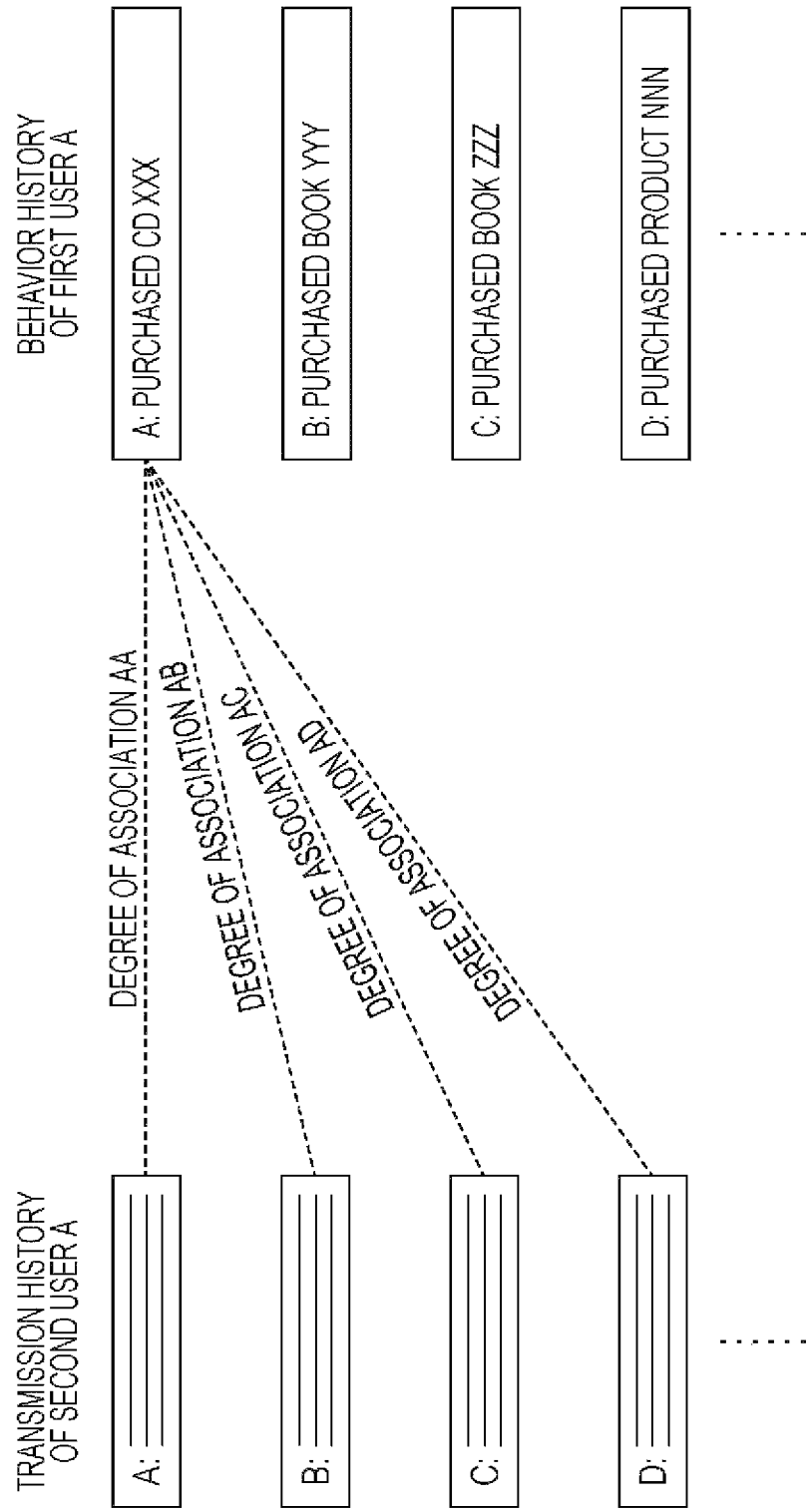
FIG. 6 is a diagram illustrating examples of the degrees of association that a degree-of-association calculation section 112 calculates in this embodiment.

FIG. 6 illustrates examples of the degree of association that the degree-of-association calculation section 112 calculates in this embodiment. As shown in FIG. 6, the degree-of-association calculation section 112 calculates the degree of association for each of combinations of a plurality of behavior histories A to D of the first user A and a plurality of transmission histories A to D of a second user A. For example, the degree-of-association calculation section 112 calculates the degree of association AA for a combination of the behavior history A of the first user A and the transmission history A of the second user A, the degree of association AB for a combination of the behavior history A of the first user A and the transmission history B of the second user A, the degree of association AC for a combination of the behavior history A of the first user A and the transmission history C of the second user A, and the degree of association AD for a combination of the behavior history A of the first user A and the transmission history D of the second user A. As described above, the degree-of-association calculation section 112 calculates the degree of association for all of combinations of all the behavior histories of one first user A and all the transmission histories of one second user A.

Figure 7:
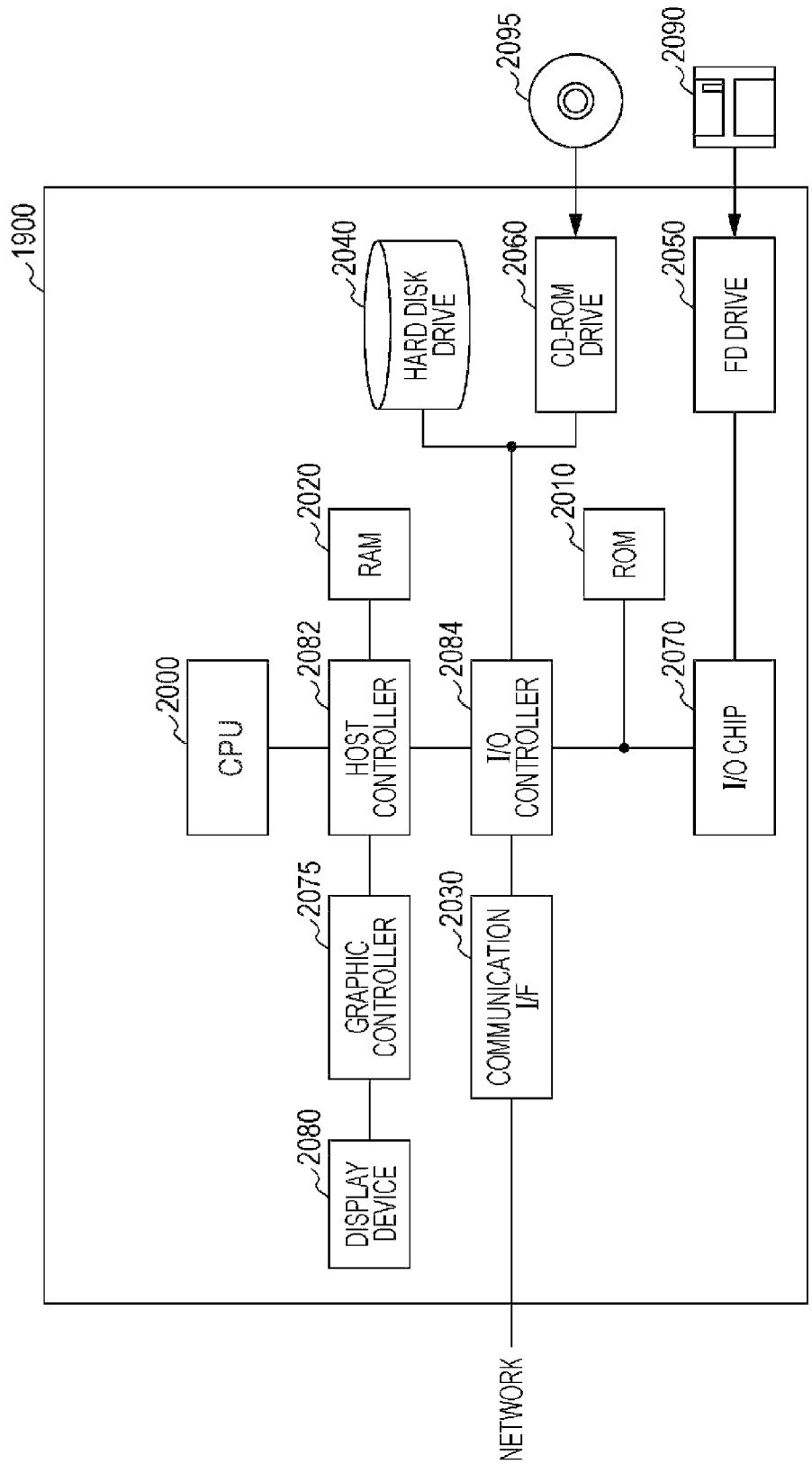
FIG. 7 is a diagram illustrating an example of the hardware configuration of a computer 1900.

FIG. 7 illustrates an example hardware configuration of a computer 1900 serving as the information processing apparatus 10. The computer 1900 according to this embodiment includes CPU peripherals including a CPU 2000, a RAM 2020, and a graphic controller 2075, and a display device 2080 which are mutually connected by a host controller 2082; an input/output section including a communication interface 2030, a hard disk drive 2040, an input/output controller 2084, and a CD-ROM drive 2060 which are connected to the host controller 2082 by an input/output controller 2084; and a legacy input/output section including a ROM 2010, a flexible disk drive 2050, and an input/output chip 2070 which are connected to the input/output controller 2084.

The host controller 2082 connects the RAM 2020, the CPU 2000 that accesses the RAM 2020 at a high transfer rate, and the graphic controller 2075 together. The CPU 2000 operates on the basis of a program stored in the ROM 2010 and the RAM 2020 to control the components.

The graphic controller 2075 acquires image data that the CPU 2000 and so on generate on a frame buffer provided in the RAM 2020 and displays the data on the display device 2080. Alternatively, the graphic controller 2075 may include a frame buffer that stores image data generated by the CPU 2000 and so on.

The input/output controller 2084 connects the host controller 2082 with the communication interface 2030, the hard disk drive 2040, and the CD-ROM drive 2060, which are relatively high-speed input/output devices. The communication interface 2030 communicates with another device via a network by wire or wirelessly.

The communication interface 2030 functions as hardware for communication in the information processing apparatus 10. The hard disk drive 2040 stores a program and data that the CPU 2000 in the computer 1900 uses.

The CD-ROM drive 2060 reads a program or data from a CD-ROM 2095 and provides it to the hard disk drive 2040 via the RAM 2020.

The input/output controller 2084 connects to the ROM 2010, the flexible disk drive 2050, and the input/output chip 2070, which are relatively low-speed input/output devices. The ROM 2010 stores a boot program that the computer 1900 executes at startup and/or a program that depends on the hardware of the computer 1900, and so on.

The flexible disk drive 2050 reads a program or data from a flexible disk 2090 and provides it to the hard disk drive 2040 via the RAM 2020. The input/output chip 2070 connects the flexible disk drive 2050 to the input/output controller 2084 and connects various input-output devices to the input/output controller 2084 via a parallel port, a serial port, a keyboard port, or a mouse port.

The program provided to the hard disk drive 2040 via the RAM 2020 is stored in a storage medium, such as the flexible disk 2090, the CD-ROM 2095, or an IC card, and is provided by a user. The program is read from the storage medium, is installed in the hard disk drive 2040 in the computer 1900 via the RAM 2020, and is executed in the CPU 2000.

The program installed in the computer 1900 for causing the computer 1900 to function as the information processing apparatus 10 includes a behavior-history acquisition module, a transmission-history acquisition module, a determination module, a degree-of-association calculation module, a degree-of-similarity calculation module, an identical-user extraction module, a degree-of-importance calculation module, and a delivery module. These program and modules may work the CPU 2000 and so on so that the computer 1900 functions as the behavior-history acquisition unit 102, the transmission-history acquisition unit 104, the determination unit 110, the degree-of-association calculation section 112, the degree-of-similarity calculation section 114, the identical-user extraction section 116, the degree-of-importance calculation unit 120, and the delivery unit 130.

Information processing described in the program is read by the computer 1900 and functions as the behavior-history acquisition unit 102, the transmission-history acquisition unit 104, the determination unit 110, the degree-of-association calculation section 112, the degree-of-similarity calculation section 114, the identical-user extraction section 116, the degree-of-importance calculation unit 120, and the delivery unit 130, which are specific units in which software and the various hardware resources described above cooperate. The information processing apparatus 10 suitable for intended use is configured by these specific means implementing calculation or processing of information according to the intended use of the computer 1900 of this embodiment.

In an example, for communication between the computer 1900 and an external device or the like, the CPU 2000 executes a communication program loaded on the RAM 2020 and instructs the communication interface 2030 to perform communication processing based on processing details described in the communication program.

The communication interface 2030 reads transmission data stored in a transmission buffer area or the like provided in a storage device, such as the RAM 2020, the hard disk drive 2040, the flexible disk 2090, or the CD-ROM 2095, under the control of the CPU 2000 and transmits the transmission data to a network or writes reception data received from the network to a reception buffer area or the like provided in the storage device.

The communication interface 2030 may transfer transmission/reception data to/from a storage device by direct memory access (DMA), as described above, or alternatively, the CPU 2000 may transfer transmission/reception data by reading the data from the destination communication interface 2030 or storage device and writing the data to the destination communication interface 2030 or storage device.

Furthermore, the CPU 2000 reads all or necessary part of files or databases stored in external storage devices, such as the hard disk drive 2040, the CD-ROM drive 2060 (CD-ROM 2095), and the flexible disk drive 2050 (flexible disk 2090), into the RAM 2020 by DMA transfer or the like and performs various processes on the data in the RAM 2020.

The CPU 2000 writes the processed data back to the external storage devices by DMA transfer or the like. Since the RAM 2020 can be regarded as a temporary storage of the content in the external storage devices in such processes, the RAM 2020 and the external storage devices are collectively referred to as memories, storages, or storage devices in this embodiment.

Various items of information in this embodiment, such as programs, data, tables, and databases, are stored on such storage devices and are subjected to information processing. The CPU 2000 can also store part of the content of the RAM 2020 in a cache memory and can write and read the cache memory. Since the cache memory takes charge of part of the function of the RAM 2020 also in such a configuration, the cache memory is also included in the RAM 2020, the memories, and/or the storage devices in this embodiment except a case where it is distinguished therefrom.

Furthermore, the CPU 2000 performs, on data read from the RAM 2020, various processes including calculation, information processing, determination on conditions, search for information, and replacement of information described in this embodiment, which are designated by an instruction sequence of the program, and writes back the data to the RAM 2020. For example, for the determination on conditions, the CPU 2000 determines whether various variables shown in this embodiment satisfy a condition, such as being larger, smaller, equal to or greater than, equal to or less than, or equal to another variable or constant, and if the condition is satisfied (or not satisfied), the CPU 2000 goes to a different instruction sequence or calls a subroutine.

Furthermore, the CPU 2000 can search for information stored in files, databases, or the like in the storage devices. For example, in the case where a plurality of entries in which a second attribute value is associated with a first attribute value are stored in a storage device, the CPU 2000 finds an entry whose first attribute value matches a designated condition from among the plurality of entries stored in the storage device and reads a second attribute value stored in the entry to thereby obtain a second attribute value associated with the first attribute value that satisfies the predetermined condition.

The program or modules described above may be stored in an external recording medium. Examples of the recording medium include optical recording media, such as a DVD and a CD, a magneto optical recording medium, such as an MO, a tape medium, and a semiconductor memory, such as an IC card, in addition to the flexible disk 2090 and the CD-ROM 2095. The program may be provided to the computer 1900 via a network using a storage device, such as a hard disk and a RAM, provided in a server system connected to a dedicated communication network or the Internet, as a recording medium.

Although the present invention has been described using embodiments, the technical scope of the present invention is not limited to the scope of the embodiments. It will be obvious to those skilled in the art that various changes and modifications of the embodiments may be made. It will also be obvious from the scope of the invention that such changes and modifications are also included in the technical scope of the present invention.

It is to be understood that the processes, such as the operations, procedures, steps, and stages of the devices, systems, programs, and methods shown in the scope of Claims, specification, and drawings, can be achieved in any execution sequence, unless otherwise specified, such as "before" or "prior to", and unless an output of a previous process is used in the following process. Even if the scope of Claims, the specification, and the operation procedure in the drawings are described using "first", "second", etc. for the purpose of convenience, it is not absolutely necessary to execute the operation in this order.

What is claimed is:

1. An apparatus comprising:
a memory; and
a processor, wherein the processor is configured to:
acquire behavior histories of a first user identified by a first-user identification information;
acquire information transmission histories of a second user identified by a second-user identification information;
determine an identity between the first user and the second user on the basis of at least behavior details, a plurality of degrees of association for the plurality of combinations, transmission details, and profile information on the first user and profile information on the second user,
wherein the behavior details are included in the behavior histories and the transmission details are included in the transmission histories, and
wherein determining the identity between the first user and the second user on the basis of the plurality of degrees of association includes calculating a degree of association for each combination of one or more behavior histories of the first user and one or more transmission histories of the second user; and
display in response to determining the identity between the first user and the second user, an advertisement to the second user.

2. The apparatus according to claim 1, wherein the processor is further configured to:
determine the identity between the first user and the second user on the basis of behavior timing included in the behavior histories and transmission timing included in the transmission histories.

3. The apparatus according to claim 2, wherein the processor is further configured to:
identify from the behavior history of the first user, that the first user uploaded an image post of a product on a website;
identify from the transmission history of the second user, that the second user commented on the image post;
determine, using the behavior timing and transmission timing, that the second user commented on the image post within a predetermined time;
generate, in response to determining that the second user commented on the image post within the predetermined time, a link to a second web site that is selling the product in the image post; and
display the link to the second user with the advertisement.

4. The apparatus according to claim 1, wherein the processor is further configured to:
calculate a degree of similarity for each of combinations of each of the plurality of first user and each of the plurality of second user on the basis of the plurality of degrees of association to extract a combination of the first user and the second user whose similarity is a predetermined threshold or greater.

5. The apparatus according to claim 4, wherein the processor is further configured to:
calculate a degree of importance of a user specified from the first user and the second user corresponding to a combination of the first user and the second user on the basis of the degree of similarity of the combination of the first user and the second user and a degree of influence of transmission of information from the second user included in the combination.

6. The apparatus according to claim 1, wherein the processor is further configured to:
calculate a degree of difference indicating the degree of difference between the first user and the second user for each combination of the behavior histories of the first user and the transmission histories of the second user and determines an identity between the first user and the second user on the basis of the degrees of association and the degrees of difference.

7. The apparatus according to claim 1, wherein the processor is further configured to:
acquire, as information transmission histories of the second user, information posting histories of the second user logging in a Website that receives posted information using the second-user identification information and posting information to the Website.

8. The apparatus according to claim 1, wherein the processor is further configured to:
acquire product or service purchase histories via the Internet as behavior histories of the first and second users.

9. The apparatus according to claim 1, wherein the processor is further configured to:
acquire transportation use histories as behavior histories of the first and second users.

10. The apparatus according to claim 1, wherein the processor is further configured to:
acquire a transmission history obtained by searching for the transmission history with an external server; and
extract a transmission history including information related to the behavior history from the retrieved transmission history.

11. The apparatus according to claim 10, wherein the processor is further configured to:
extract a transmission history including information related to a product or service related to the behavior history from the retrieved transmission history.

12. The apparatus according to claim 10, wherein the processor is further configured to:
extract a transmission history including a keyword indicating that a product or service related to the behavior history is purchased from the retrieved transmission history.

* * * * *